United States Patent [19]

Whiteman et al.

[11] Patent Number: 4,910,608
[45] Date of Patent: Mar. 20, 1990

[54] IMAGERY DATA COMPRESSION MECHANISM EMPLOYING ADAPTIVE VECTOR QUANTIZER

[75] Inventors: Peter Whiteman, Melbourne Beach; Thu V. Vu, West Melbourne, both of Fla.

[73] Assignee: Harris Corporation, Melbourne, Fla.

[21] Appl. No.: 282,112

[22] Filed: Dec. 9, 1988

[51] Int. Cl.[4] .............................................. H04N 1/024
[52] U.S. Cl. .................................... 358/433; 358/447; 358/463; 383/56
[58] Field of Search ........................ 358/433, 447, 463; 382/56

[56] References Cited

U.S. PATENT DOCUMENTS

| | | | |
|---|---|---|---|
| 4,410,916 | 10/1983 | Pratt et al. | 358/433 |
| 4,517,607 | 5/1985 | Ohkouchi et al. | 358/447 |
| 4,581,638 | 4/1986 | Chiarigitone et al. | 358/433 |
| 4,646,355 | 2/1987 | Petrick et al. | 358/447 |
| 4,717,962 | 1/1988 | Moore | 358/433 |
| 4,805,030 | 2/1989 | Tanaka | 358/433 |
| 4,831,659 | 5/1989 | Miyaoka et al. | 358/433 |

*Primary Examiner*—Edward L. Coles, Sr.
*Attorney, Agent, or Firm*—Antonelli, Terry & Wands

[57] ABSTRACT

Imagery data is compressed by subdividing the data into a plurality of blocks. Each block is encoded into a bit map and a pair of threshold values. The bit map provides an array of binary encoded imagery data-representative vector combinations. A vector combination is subdivided into a set of adjacent sub-blocks, each of which is examined to determine whether or not it is associated with a prescribed attribute of the image. If the vector is associated with a prescribed attribute, a code representative of that attribute is generated. If the vector is not associated with a prescribed attribute of the image, prescribed portions of the vector are inverted to derive modified vectors that are associated with prescribed image attributes. For each such modified vector a corresponding code is generated. Using each of these corresponding codes, image data is effectively reconstructed and then compared with the original image data. That modified vector which results in the minimum error between the reconstructed image data and the original data is then used to generate a prescribed binary output code representative of an associated attribute of the image. The binary output codes of a respective block of imagery data are then assembled and, together with the threshold values for that block of data, transmitted as a combined output code. At the receiver site, the image data is reconstructed using a look-up table mechanism in accordance with a translated bit map and the transmitted threshold values.

17 Claims, 9 Drawing Sheets

FIG. 4

| 0 | 0 |
|---|---|
| 0 | 0 |

| 1 | 1 |
|---|---|
| 1 | 1 |

| 1 | 1 |
|---|---|
| 0 | 0 |

| 0 | 0 |
|---|---|
| 1 | 1 |

| 1 | 0 |
|---|---|
| 1 | 0 |

| 0 | 1 |
|---|---|
| 0 | 1 |

| 1 | 0 |
|---|---|
| 0 | 1 |

| 0 | 1 |
|---|---|
| 1 | 0 |

8

IMAGERY DATA COMPRESSION MECHANISM EMPLOYING ADAPTIVE VECTOR QUANTIZER

United States Government has a license in the subject matter of the present application under Government Contract Number F08635-87-C-0102.

FIELD OF THE INVENTION

The present invention relates in general to communication systems and is particularly directed to a scheme for compressing imagery data to a bit rate on the order of one bit per pixel through the combined use of block truncation encoding and vector quantization signal processing.

BACKGROUND OF THE INVENTION

Data compression signal processing mechanisms are used in conjunction with a variety of imagery data (e.g. video, facsimile data) and for color and black-and-white applications. One of the more commonly used encoding schemes is the so-called block coding technique which separates a given picture into a matrix of image blocks which, in turn, is subdivided into a plurality of pixels. One type of block encoding mechanism that is typically employed for imagery data compression is the block truncation coder which operates on subdivided blocks of data that make up the image and, for each block, generates a pair of threshold values "a" and "b", that are used in the data reconstruction process, and an accompanying bit map "m" of binary data. With the bit rate per block of data being defined as the ratio of the total number transmitted bits (here, the sum of the number of bits that constitute the bit map "m" and the threshold values "a" and "b") to the number of pixels of the block of data, it can be seen that, for a given grey level resolution of the threshold values, the bit map "m" constitutes a large overhead that governs the extent to which the bit rate can be compressed. Consequently, if a lower bit rate is to be achieved, it is necessary to encode the bit map to a smaller size.

One proposal for reducing the size of the transmitted bit map, described in an article entitled "Multilevel Graphics Representation Using Block Truncation Coding" by O. R. Mitchell et al., Proceedings of the IEEE, Vol. 68, NO. 7, July 1980, involves transmitting only a portion of the bits of the map, with reconstruction of the image being accomplished according to a fixed logical rule using a look-up table. Unfortunately, this technique is not adaptive to changing image statistics; i.e. The logical look-up table is fixed in the reconstruction unit for all classes of input data.

A second approach, described in an article by G. R. Arce et al., entitled "BTC Coding Using Median Filter Roots", IEEE Transactions, Vol COM-31, No. 6, June 1983, is based upon the use of median roots to transform the bit map into a two-dimensional median filter root signal using a trellis code, making the mechanism impractical from a hardware implementation standpoint.

A third scheme, described in an article by V. R. Upkidar et al., entitled "BTC Image Coding Using Vector Quantization", IEEE Transactions, Vol. COM-35, No. 3, March 1987, is based upon vector quantization (to be described in detail below) of the bit map. However, the method is not adaptive to the input data and depends upon the use of a predetermined training sequence to derive an optimum vector code set, which is then fixed with respect to the data being processed.

Vector quantization is a mechanism for mapping a sequence of discrete input vectors into a smaller number of output vectors, in order to reduce the number of bits required to represent the input vectors. For example, a bit map of binary digits ("1"s and "0"s) representative of an array of x by x pixels has an input vector set of 2 to the x-squared values. The code book or look-up table for any class of input data is derived from a predetermined training sequence of input vectors. The optimum code book, whose design algorithm is described in an article by Y. Lind et al., entitled "An Algorithm for Vector Quantizer Design" IEEE Transactions, Vol. Com-28, No. 1, Jan. 1980, is the one that yields the smallest difference or least distortion between the training sequence of vectors and reproduced vectors. Unfortunately, the code book must operate on data outside the training set (i.e. with images that were not used for the code book design), thereby making system performance dependent upon the structure of a predetermined look-up table. As a result, images are characterized into broad categories which average out the individual variations within the image. Areas of images may be different, at the edges, for example, and are therefore processed with larger errors.

This problem can be reduced to some extent by classifying the image into different input sets, processed separately using different code books derived, in turn, from different training sets, as described in an article by B. Ramamurthi et al., entitle "Classified Vector Quantization of Images", IEEE Transactions, Vol. COM-34, No. 11, Nov. 1986.

SUMMARY OF THE INVENTION:

In accordance with the present invention, the complexity and performance shortcomings of conventional imagery encoding mechanisms described above are obviated by a new and improved imagery data compression mechanism that does not require the use of a predetermined training sequence and which is adaptive from image to image and within the image itself, so that edge orientations and grey levels are preserved. For this purpose, in accordance with the compression mechanism of the present invention, an array of imagery representative (pixel) data is divided into a plurality of contiguous blocks of data, each of which is then encoded, using a block truncation coding mechanism, into a bit map "m" and an associated pair of threshold values "a" and "b". The bit map "m" provides an array of binary encoded imagery data-representative vector combinations. Each bit map vector combination is further subdivided into a set of adjacent sub-blocks of reduced (e.g. four bits per sub-block code resolution. Each sub-block of binary data values defines a vector that is examined to determine whether or not it is associated with a prescribed attribute (e.g. an edge) of the image. If the vector is associated with a prescribed attribute, a (four bit) code representative of that attribute is generated. If the vector is not associated with a prescribed attribute of the image (as in the case of bits randomly distributed due to noise), prescribed portions of the vector are inverted to derive modified vectors that are associated with prescribed image attributes. For each such modified vector a corresponding (four bit) code is generated. Using each of these corresponding codes, image data is effectively reconstructed and then compared with the original image data. That modified vector which results in the minimum error between the reconstructed image data and the original data is then used to generate a prescribed binary output code that is representative of an associated attribute of the image. The binary output codes of a respective block of imagery data are then assembled and, together with the threshold values for that block of data, transmitted as a combined output code. At the receiver site, the image data is reconstructed using a look-up table mechanism in accordance with a translated bit map and the transmitted threshold values.

Advantageously, because the compression mechanism of the present invention transmits output codes that are associated only with prescribed attributes of an image, the invention has an inherent enhancement property in that it tends to eliminate isolated data, while preserving contiguous data.

BRIEF DESCRIPTION OF THE DRAWINGS

FIGS. 4-11 illustrate the manner in which a four bit sub-block bit map 31-$i$ may comprise one of eight input vectors which are respectively associated with prescribed image attributes;

DETAILED DESCRIPTION

Figure 3:
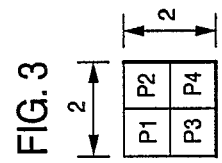
FIG. 3 shows an individual sub-block comprised of four mutually adjacent bits p1, p2, p3, p4.

Before describing in detail the particular improved imagery data compression mechanism in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
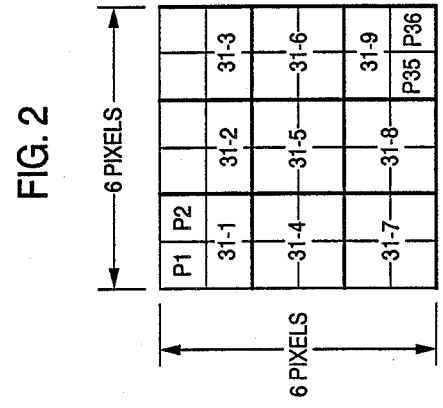
FIG. 2 diagrammatically illustrates a further subdivision of a block of 6×6 pixels into nine 2×2 sub-blocks.
Figure 1:
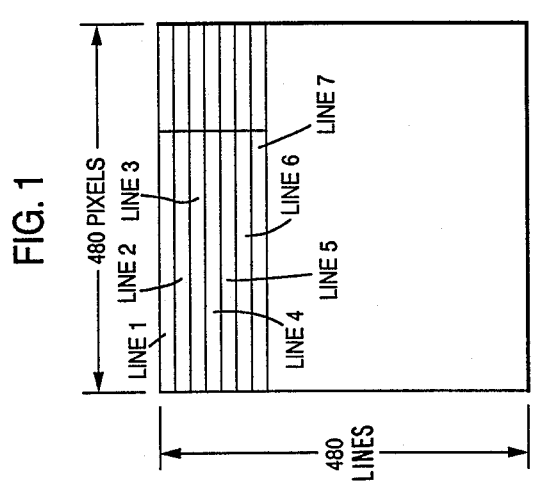
FIG. 1 diagrammatically shows a video image array of 480×480 video pixels and an individual 6×6 block of pixels into which the array may be divided.

Referring initially to FIG. 1 there is diagrammatically shown a video image array 10 of 480×480 (either color or black and white) video pixels and an individual pixel block 11 of (6×6) pixels (one of 6400 blocks of the 480×480 pixels) into which the array may be divided. As further shown in FIG. 2, each of the respective pixels of block 11 has an associated pixel value P1, P2, P3, ..., Pi, ..., P35, P36 that is to be encoded in accordance with a block truncation coding (BTC) mechanism, and thereby produce, for that block, a bit map of m=36 binary data values ("1"s and "0"s) and a set of multibit (grey level resolution) threshold values "a" and "b". For a description of an exemplary BTC mechanism through the execution of which each block may be encoded, attention may be directed to an article by M. D. Lema et al., entitled "Absolute Moment Block Truncation Coding and Its Application to Color Images", IEEE Transactions, Vol. COM-32, No. 10, Oct. 1984. Assuming a threshold value resolution of six bits, then, for a thirty-six pixel block, the resulting bit rate is $$\frac{n(a) + n(b) + m}{m} = \frac{6 + 6 + 36}{36} \text{ bits per pixel, or}$$

a bit rate of 48/36=1.33 bits per pixel.

In order to reduce this bit rate to a level on the order of one bit per pixel, the value of m in the numerator of the above expression is encoded to a modified (compressed) value m, using a vector quantization mechanism that effectively reduces the number of bits in the transmitted bit map. (The number of "a" or "b" bits is not reduced to less than six bits in order not to reduce the dynamic range, or gray level accuracy, of the reproduced data.)

More particularly, for any given block 11 of 36 pixels there are 2³⁶ possible (bit map) vector combinations of the binary data. Pursuant to the present invention, this unacceptable (in terms of bit rate) number is reduced by using a bit map library the contents of which are associated only with image attributes that are required to characterize the image. Bit map patterns comprised of randomly distributed pixel data values that are, most likely, not associated with characteristics of the image, are modified to produce bit map patterns of the library, specifically, bit map patterns which, upon reconstruction, produce an image having minimum error with respect to the original image. Associated with each of the bit patterns of the library is a code the size of which is reduced considerably with respect to the m=36 bit code prior to vector quantization. It is this code that is combined with the "a" and "b" threshold values for transmission.

In order to generate these modified codes, each block 11 of thirty-six bit map data values is subdivided into nine sub-blocks 31-1 . . . 31-9, each comprised of four mutually adjacent bits p1, p2, p3, p4, as shown in FIG. 3 Each four bit sub-block 31-$i$ may comprise one of sixteen possible input vectors 0000, 0001, . . . , 1101, 1111, eight of which are respectively associated with prescribed image attributes (particularly edges) pictorially illustrated in FIGS. 4-11 and defined as follows, in Table 1.

TABLE 1

| Attribute No | p1. | p2. | p3. | p4. | Image Characteristic | Status |
|---|---|---|---|---|---|---|
| 1 | 0 | 0 | 0 | 0 | No edge data | Keep |
| 2 | 1 | 1 | 1 | 1 | No edge data | Keep |
| 3 | 1 | 1 | 0 | 0 | Horizontal edge | Keep |
| 4 | 0 | 0 | 1 | 1 | Horizontal edge | Keep |
| 5 | 1 | 0 | 1 | 0 | Vertical edge | Keep |
| 6 | 0 | 1 | 0 | 1 | Vertical edge | Keep |
| 7 | 1 | 0 | 0 | 1 | Diagonal edge | Keep |
| 8 | 0 | 1 | 1 | 0 | Diagonal edge | Keep |

Each of the remaining eight possible input vectors contains either three "1"s and a single "0", or three "0"s and a single "1" and, rather than representing a prescribed image attribute, is assumed to contain an inverted bit. As a consequence, whenever any sub-block 31-$i$ contains one of these eight "undefined" vectors, respectively different individual bit locations are inverted, so as to convert the undefined vector into one of the eight vectors associated with prescribed image attributes listed above, in Table 1.

In the course of this conversion process, four of the attribute codes listed in Table 1 will be generated. The four codes that are not generated are ignored, since conversion to these codes would require a three bit change to the input vector and, consequently, would produce larger errors upon reconstruction.

For each converted sub-block, its associated image is reconstructed using the "a" and "b" thresholds of the 6×6 pixel block from which the sub-block was subdivided. The error between each reconstructed image and the original image is calculated and that converted vector which results in the lowest error is substituted in place of the "undefined" input vector. This process is repeated for all vectors, in all sub-blocks, and all vectors are therefore mapped into the set of vectors listed in Table 1. Since there are only eight vectors in this set, only a three bit binary code is required to represent the contents of each sub-block. As a consequence, the number of bits required to represent the contents of a 6×6 pixel block is reduced from $(2^4)^9$, or 36 bits, to $(2^3)^9$, or 27 bits. Consequently, the bit rate of the 'converted' vector block (again, using six bit grey level resolution for the "a" and "b" thresholds) becomes $$\frac{27 + 6 + 6}{36} = 1.083 \text{ bits/pixel},$$

which is reduced considerably compared with the original 1.33 bits per pixel prior to the vector quantization conversion operation.

Figure 12:
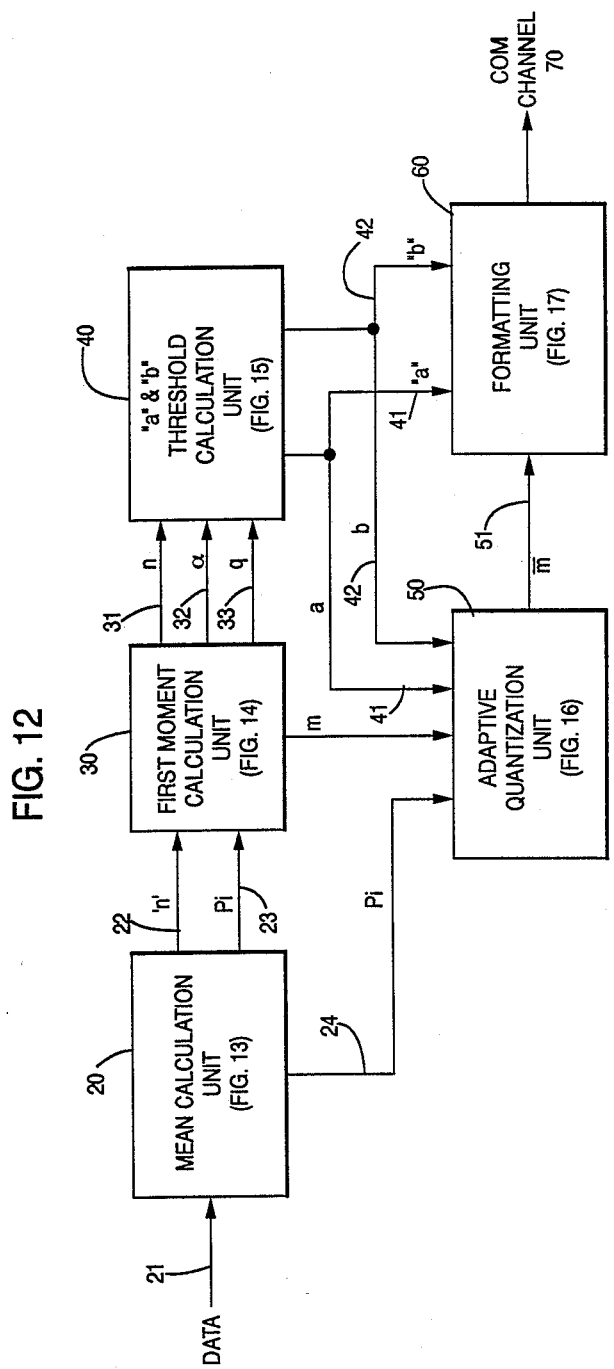
FIG. 12 diagrammatically illustrates a system for carrying out adaptive vector quantization in accordance with the imagery data compression mechanism of the present invention.

Referring now to FIG. 12, there is diagrammatically illustrated a system for carrying out adaptive vector quantization in accordance with the imagery data compression mechanism of the present invention through a series of signal processing operations to which digitized pixel data, such as that derived from a two dimensional video raster scan device (e.g. a television sensor), is applied. For purposes of the present description it will be assumed that a frame of digitized pixel data to be processed contains 480 pixels/line by 480 lines/frame imagery data, with each pixel being quantized to six bits (64 gray levels). The data is processed by the system shown in FIG. 12 a frame at a time, with the frame being subdivided into blocks of 6×6 pixels, which are further separated into sub-blocks of 2×2 pixels each, as described above. For a frame of 480×480 pixels, the 6400 (6×6) blocks of pixel data are processed sequentially.

In order to perform adaptive quantization it is initially necessary to define a set of control values through which the "a" and "b" thresholds and a bit map for each block of 36 pixels may be defined. For this purpose, each frame of quantized pixel data is coupled over an input link 21 to a mean value calculation unit 20 (shown in detail in FIG. 13, to be described below) which stores the frame and processes the data in individual blocks of 36 quantized pixel values and derives a mean value 'n', which is coupled over output link 22. Mean value calculation unit 20 also supplies the pixel values themselves over links 23 and 24 to downstream processing circuitry to be described.

The mean value 'n' of an individual block of 36 pixels and the actual values of the pixels of the block are coupled over links 22 and 23, respectively, to a first moment calculation unit 30 (to be described below with reference to FIG. 14), which generates a first moment value $\alpha$ and a value 'q' representative of the number of pixels within the block of 36 that have a value equal to or greater than the mean 'n' of the block, to be used in determining the "a" and "b" threshold values. First moment calculation unit 30 also produces a binary bit map 'm' comprised of a set of 36 binary values (1 or 0) indicating which pixels have a value that is at least equal to the mean. The mean value 'n', the first moment '$\alpha$', the q value and the bit map 'm' are coupled over output links 31, 32, 33 and 34 respectively to downstream "a" and "b" threshold processing unit 40 (shown in detail in FIG. 14) and adaptive vector quantization unit 50, to be described in detail below with reference to FIG. 16.

Threshold processing unit 40 generates "a" and "b" threshold values in accordance with the mean (n), first moment ($\alpha$) and q values supplied over links 31–33 and couples the "a" and "b" threshold values over links 41 and 42 to adaptive quantization unit 50, wherein the thresholds are combined with the bit map 'm' and pixel data supplied over links 34 and 24, respectively, to produce a compressed bit map m on output link 51. The compressed bit map m and the "a" and "b" threshold values are coupled over links 51, 41 and 42, respectively, to a data formatting unit 60 (shown in detail in FIG. 17, to be described below), which generates an output data stream for application to a digital communications transmitter (not shown) and transmission over a data communication channel 70 to a receiver site.

Figure 13:
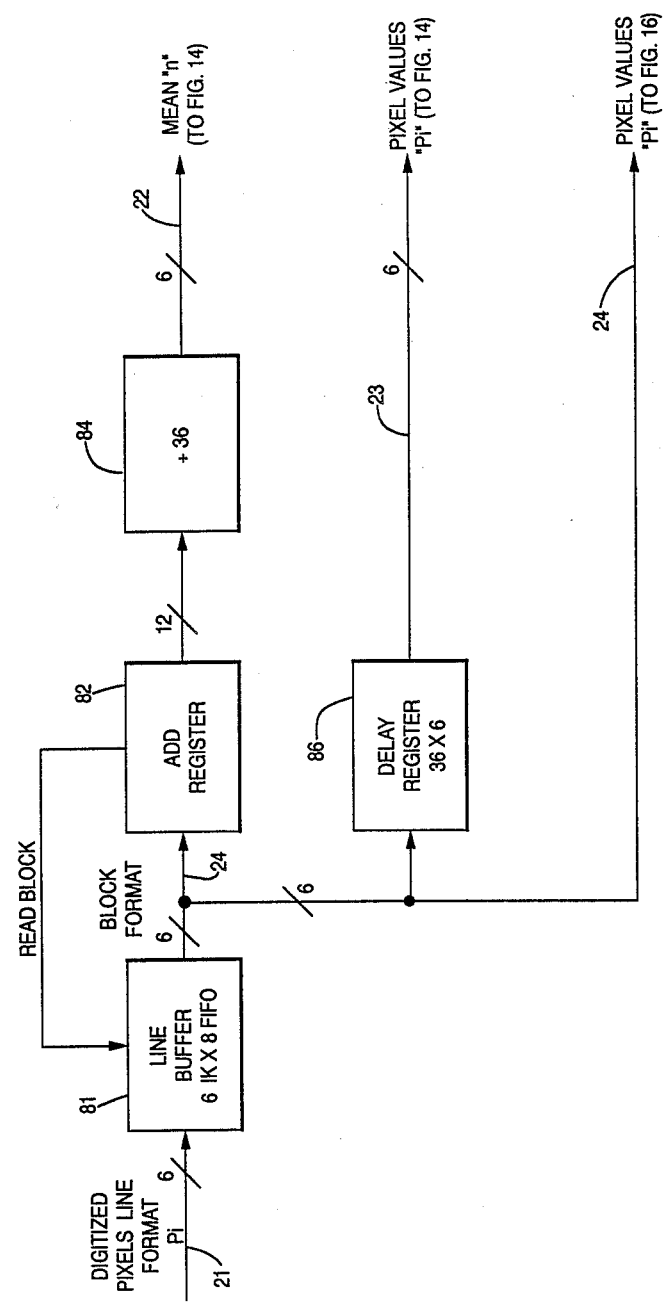
FIG. 13 diagrammatically shows the digital signal processing composition of a mean value calculation unit.

Mean Calculation Unit (FIG. 13)

Referring to FIG. 13, mean calculation unit 20 is shown as comprising a line buffer 81 to which input link 21, carrying a frame of digitized video data, is coupled. At six bit (64 gray levels) resolution, the quantized data for a line of 480 pixels requires approximately a 500×6 memory chip. From a practical standpoint, however, since memories are typically available in increments of thousands of eight, sixteen, etc. bit wide storage cells, line storage buffer is preferably configured of six 1KK8 chips, with each chip storing two lines of data, so that two pairs of six lines of data (a total of 12 lines) may be processed in ping-pong fashion. Since data is processed in blocks of 6×6 pixels, it is necessary to load the line buffer with six of the 480 lines of imagery data before compression processing commences. As data for the first six lines of the image is read out of the line buffer, data for the next six lines is read into the buffer, so that the signal processing is executed in a pipelined manner.

As pointed out above, pixel data 'p' is read out of the line buffer 81 in a 6×6 block format (see FIG. 1) and coupled over link 24 to a summation register 82 and to adaptive vector quantizer unit 50. In summation register 82, a running total of the values of the block of thirty six pixels Pi ... Pi+36 read out of line buffer 81 is maintained. The contents of summation register 82 are divided by the size of the block (36) by means of divide-by-36 divider 84 to produce on output link 22 a digital value representative of the mean value 'n' of the block of pixel data. A 36×6 register 86 is coupled to link 24 to temporarily buffer the pixel data for the block of interest. The contents of register 86 are coupled over link 23 to first moment calculation circuit 30 (FIG. 14), which uses the pixel values and the mean value 'n' on link 22 to calculate intermediate parameter values for setting the ("a" and "b") thresholds and establishing a bit map 'm' for the 6×6 block of pixel data.

Figure 14:
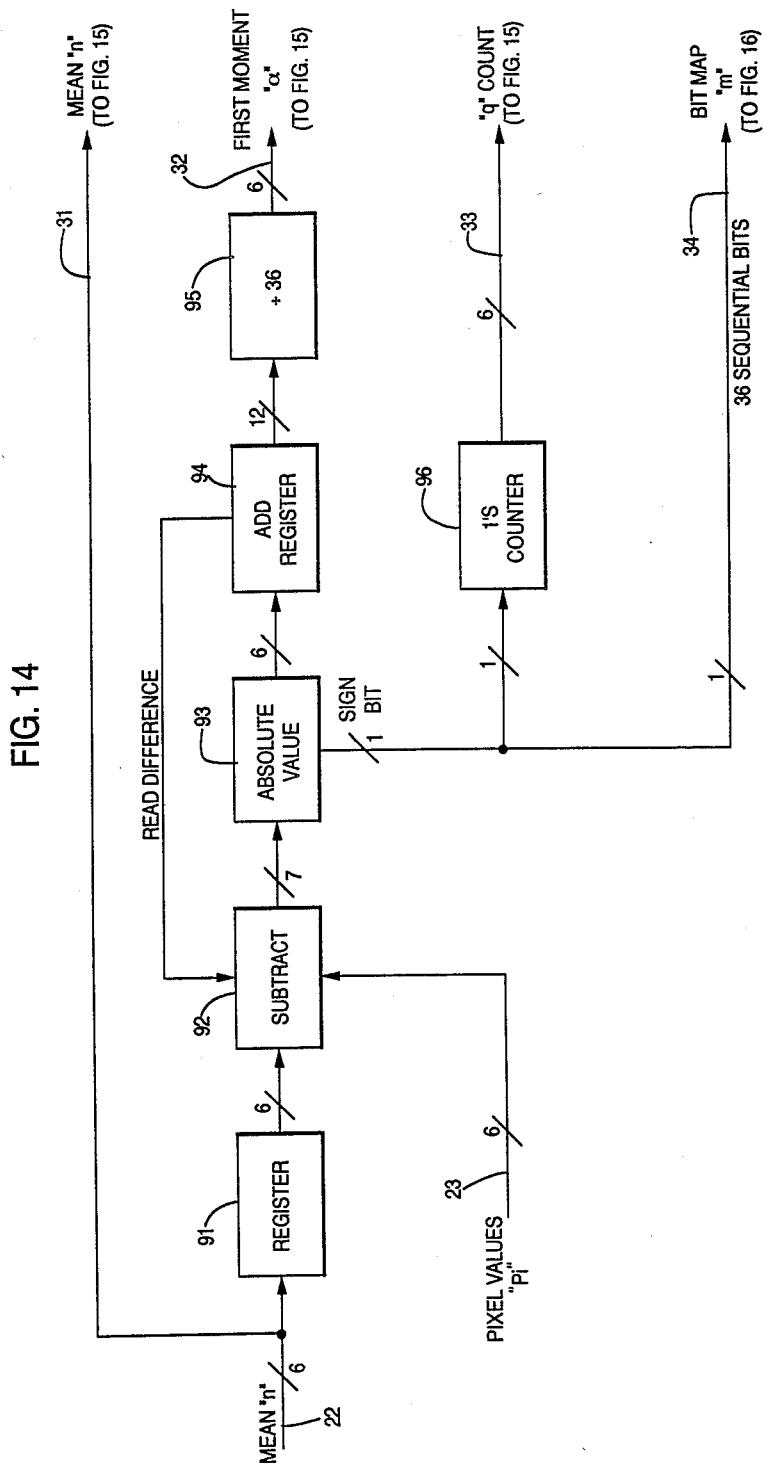
FIG. 14 diagrammatically illustrates a first moment calculation unit.

First Moment Calculation Unit (FIG. 14)

Figure 15:
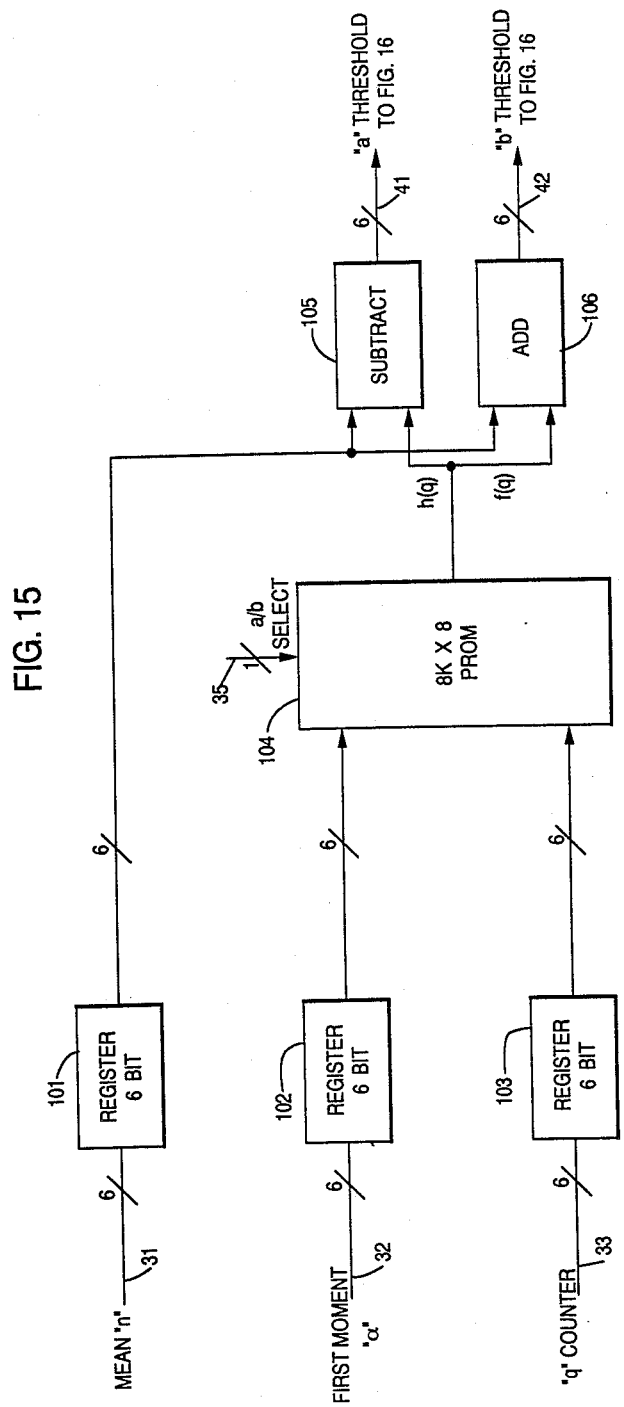
FIG. 15 diagrammatically shows the configuration of an "a" and "b" threshold calculation unit.

First moment calculation unit 30 is shown in FIG. 14 as comprising an input register 91 into which the mean value 'n' of the 6×6 block of pixels Pi ... Pi+36 stored in register 86 is coupled from link 22. The mean value 'n' on link 22 is also coupled over a link 31 to "a" and "b" threshold calculation unit 50 (FIG. 15). The contents of input register 91 are applied to one input of a difference circuit 92 a second input of which is coupled to link 23 over which the respective pixel values stored in register 86 are sequentially coupled as they are clocked out of register 86. The output of difference circuit 93 is a seven bit code comprising a sign bit and a six bit magnitude code (representative of the absolute value of the difference between a respective pixel value Pj and the mean 'n'. The successive six bit magnitude values are summed in summation register 94 while the sign bit for each pixel is applied to a 1's counter 96 and a bit map link 34. The contents of summation register 94 are applied to a divide-by-36 divider 95, the output of which represents the first moment '$\alpha$' about the mean 'n', which is coupled over link 32 to "a" and "b" threshold calculation unit 50 (FIG. 15).

The sign bit on link 34, resulting from the subtraction of the mean 'n' from the pixel values p, as produced by difference circuit 92 and absolute value circuit 93, will be a "1" if the pixel value is at least equal to the mean, and will be a "0" if the pixel value is less than the mean and is used to generate a bit map for the 6×6 block of interest. The "1" values are also summed in a "1"s counter 96 to produce a 'q' value indicating the number of pixels in the block that have a value equal to or greater than the mean 'n'. The 'q' contents of counter 96 are coupled over link 33 to "a" and "b" threshold calculation unit 50 (FIG. 15).

"A" And "B" Threshold Calculation Unit 40 (FIG. 15).

The "a" and "b" threshold values are derived in calculation unit 40 in accordance with the mean value 'n' on link 31, the first moment value '$\alpha$' from link 32 and the 'q' value on link 33, stored in respective registers 101, 102 and 103. The first moment '$\alpha$' and 'q' values are applied to a look-up table stored in an 8K×8 PROM 104, which sequentially produces the "a" and "b" values based upon the values stored in registers 1-2 and 103 and an a/b bit select bit supplied on link 35. The look-up table stored in PROM determines the "a" and "b" values in accordance with a pair of relationships f[q] and h[q], defined as:

"$h[q]$" $= 36\alpha/2[36-q]$,

"$f[q]$" $= 36\alpha/2q$.

In order to determine the actual "a" value, the h[q] value is subracted in a difference circuit 105 from the mean value 'n' stored in register 101, to supply a lower threshold "a" value on output link 41 to downstream adaptive quantization unit 50. Similarly, the upper "b" threshold value is determined by adding the mean value 'n' to the f[q] output of PROM 104 in adder circuit 106, which is supplied over output link 42 to adaptive quantization unit 50 (FIG. 16).

Figure 16:
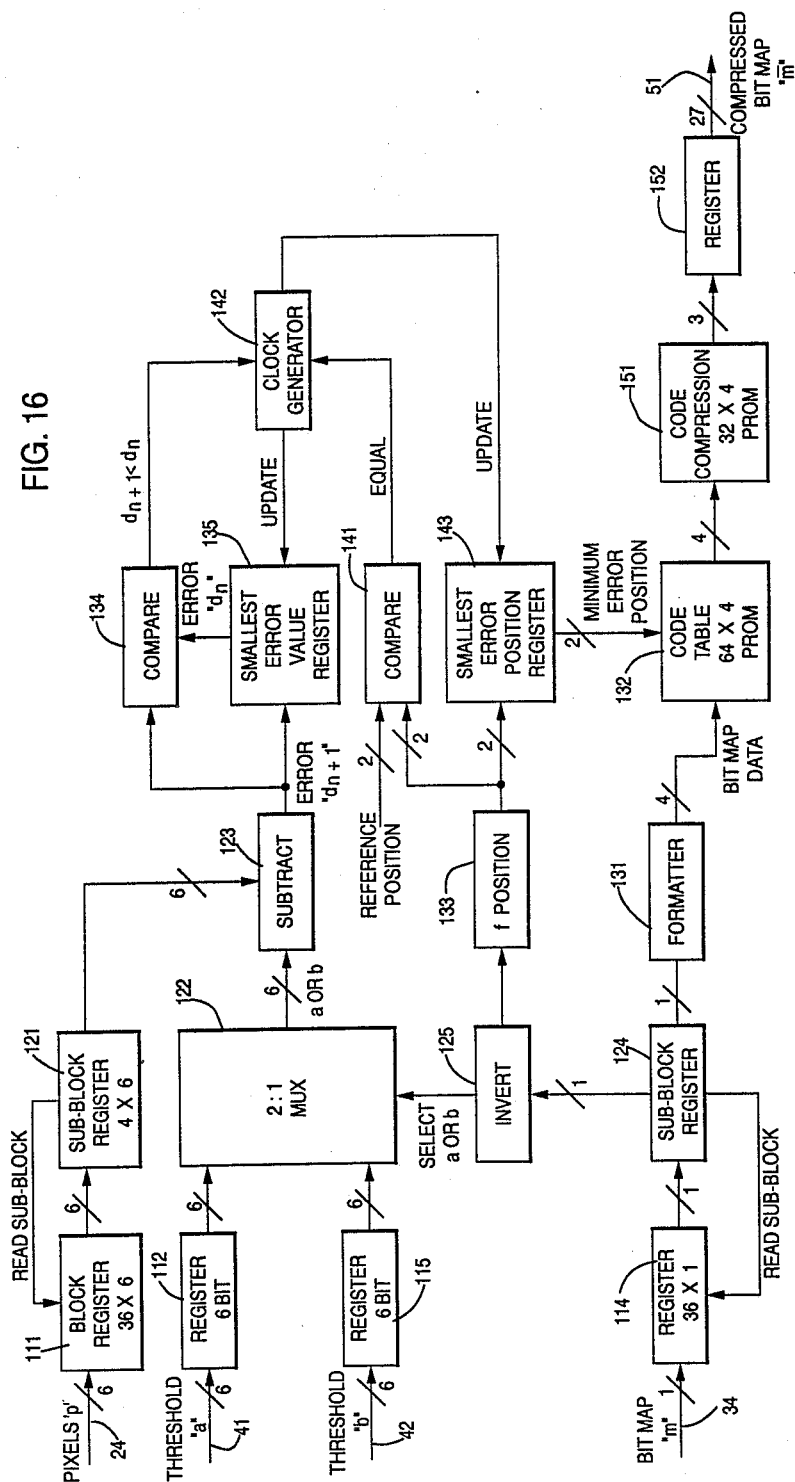
FIG. 16 is a diagrammatical illustration of the make-up of an adaptive quantization unit.

Adaptive Quantization Unit 50 Unit (FIG. 16)

As described briefly above, the adaptive quantization mechanism in accordance with the present invention subdivides blocks of 36 pixels into nine sub-blocks of four pixels each and then selectively modifies (inverts the state of) an individual one of the four pixels of the sub-block for the purpose of effectively aligning or matching the sub-block with a prescribed image feature. The alignment or matching process looks for the modified sub-block that produces the smallest error in a reconstructed image. In order to determine whether a sub-block requires modification, it is necessary to examine the bit map 'm' supplied by threshold calculation unit 30 over link 34.

For this purpose the 36 binary values of which the bit map m is comprised are stored in a bit map register 114, the contents of which are read out into a sub-block register 124 in groups or sets of four contiguous bits each, as shown in FIG. 3. An individual set of four bit bits is arranged by a formatting circuit 131 into a four bit code or vector, which is used to address a 64×4 code table PROM 132. If the vector corresponds to one of the eight attribute vectors listed in Table 1, supra, then the vector is outputted by PROM unmodified to a downstream 32×4 code compression PROM 151; a normally employed separate pair of address bits supplied from a smallest error position register 143 are ignored. If, on the other hand, the four bit vector code stored in sub-block register does not correspond to one of the eight attributes listed in Table 1, then it is assumed that one of the four bits of the vector is inverted. The position of this inverted bit (i.e. which of the four pixel locations of the sub-block shown in FIG. 3 contains an inverted bit) is defined by a two-bit code produced by smallest error register 143, so that Code Table PROM 132 produces a modified output code that corresponds to one of the attributes of Table 1.

When it has been determined that the sub-block of interest contains an inverted bit, then the respective bits of the four bit sub-block stored in register 124 are individually inverted (to a 1 or 0). For each bit position and depending upon whether the inversion produces a 1 or a 0, a multiplexer 122 will couple the contents of one of registers 112 and 113, into which the "a" and "b" threshold values on links 41 and 42, respectively, have been stored, to one input of a subtraction circuit 123. A second input of subtraction circuit 123 is coupled to a further sub-block register 121 which stores the actual pixel values of a respective one of the nine sub-block contents of a block register 111, coupled to receive the 36 pixel values supplied over link 24.

The output of subtraction circuit 123 is representative of the difference $d_i$ between the magnitude of the pixel Pi and its associated "a" or "b" threshold value as supplied by multiplexer 122, in accordance with the 1 or 0 value of the bit map location for the pixel. Namely, the output of subtraction circuit 123 is defined by the expression $d_1 = Pi - [a$ or $b]$, where i corresponds to one of each of the four pixel locations P1, P2, P3 and P4. This difference or error value is coupled to a comparator 134 and a smallest error register 135, which stores the lowest valued difference of the four pixel positions of the sub-block. At the time of receiving the first error value, the contents of register 135 are cleared, so that the error value is immediately stored in register 135. As the next and subsequent error values $d_i$ are produced by subtraction circuit 123, they are successively compared with the contents of register 135 by comparator 134. Whenever comparator 134 determines that the most recent difference value $d_i$ is less than the current contents of register 135, the contents of register 135 are caused to be updated with the value of the current error output of subtraction circuit 123 (by way of control clock generator 142, which is also coupled to update smallest error position register 143). The location or bit position within the sub-block at which an update occurs is determined by a successively incremented sub-block bit position counter 133, as the respective bits that are stored in sub-block register 124 are inverted by inversion logic circuit 125. A comparator 141 compares an initial reference position code with the output of counter 133 during the sequential invert, compare and counter advance steps.

Upon counter 133 rolling over to its original bit position value, it supplies an equality or inhibit signal to clock generator 142, terminating the sub-block inversion and smallest error location process. At this point register 143 contains a code which identifies the location of the bit within the four bit vector, the inversion of which yields a modified sub-block whose pixel values produce the smallest error. This two bit minimum error position code is used in conjunction with the vector supplied by formatter 131 to access one of the attribute vectors of Table 1 from PROM 132 that corresponds to the minimum error modified sub-block. Namely, the output of PROM132 is a four bit code which only includes the attributes of Table 1 as addresses to a code compression PROM 151, which outputs a three bit code for each one of the eight possible sub-blocks (of Table 1). The nine sub-blocks of a thirty-six pixel block are therefore encoded as nine three-bit output codes, yielding a 27 bit compressed bit map m, which is stored in output register 152 for application over link 51 to formatting unit 60, shown in FIG. 17.

Figure 17:
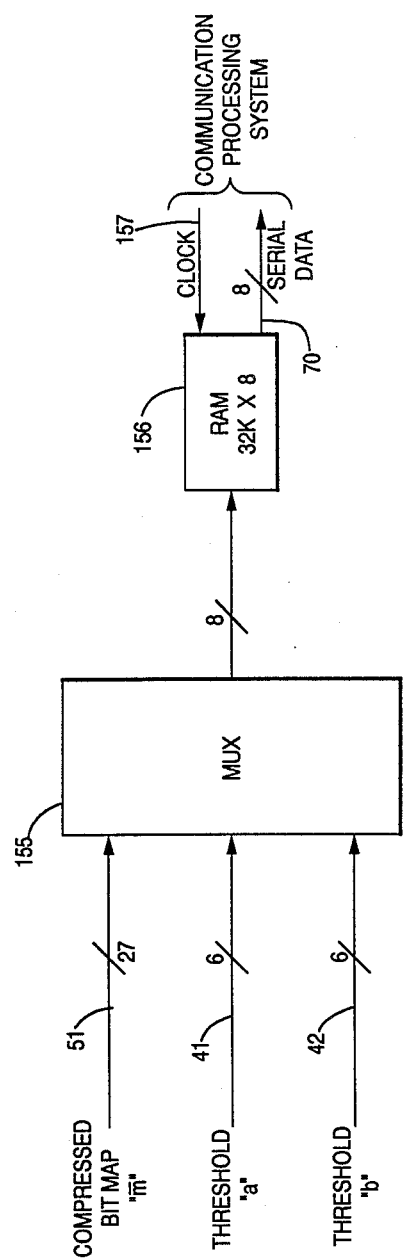
FIG. 17 diagrammatically shows the amke up of formatter unit 60 of FIG. 12.

Formatter Unit 60 (FIG. 17)

Formatter unit 60 is comprised of a multiplexer 155 and a random access memeory 156. The inputs to multiplexer 155 consist of the 27 bits of the compressed bit map m on link 51 from adaptive quantization unit 50 and the 12 "a" and "b" threshold values from threshold calculation unit 40. An additional bit, for packing and synchronization purposes, yields a total of 40 bits per sub-block, which are organized into five 8-bit bytes and coupled from multiplexer 155 to RAM 156 for storage. The contents of RAM 156 are read out on demand (controlled by clock link 157) by an associated communications interface (not shown) over serial data output link 70.

Figure 18:
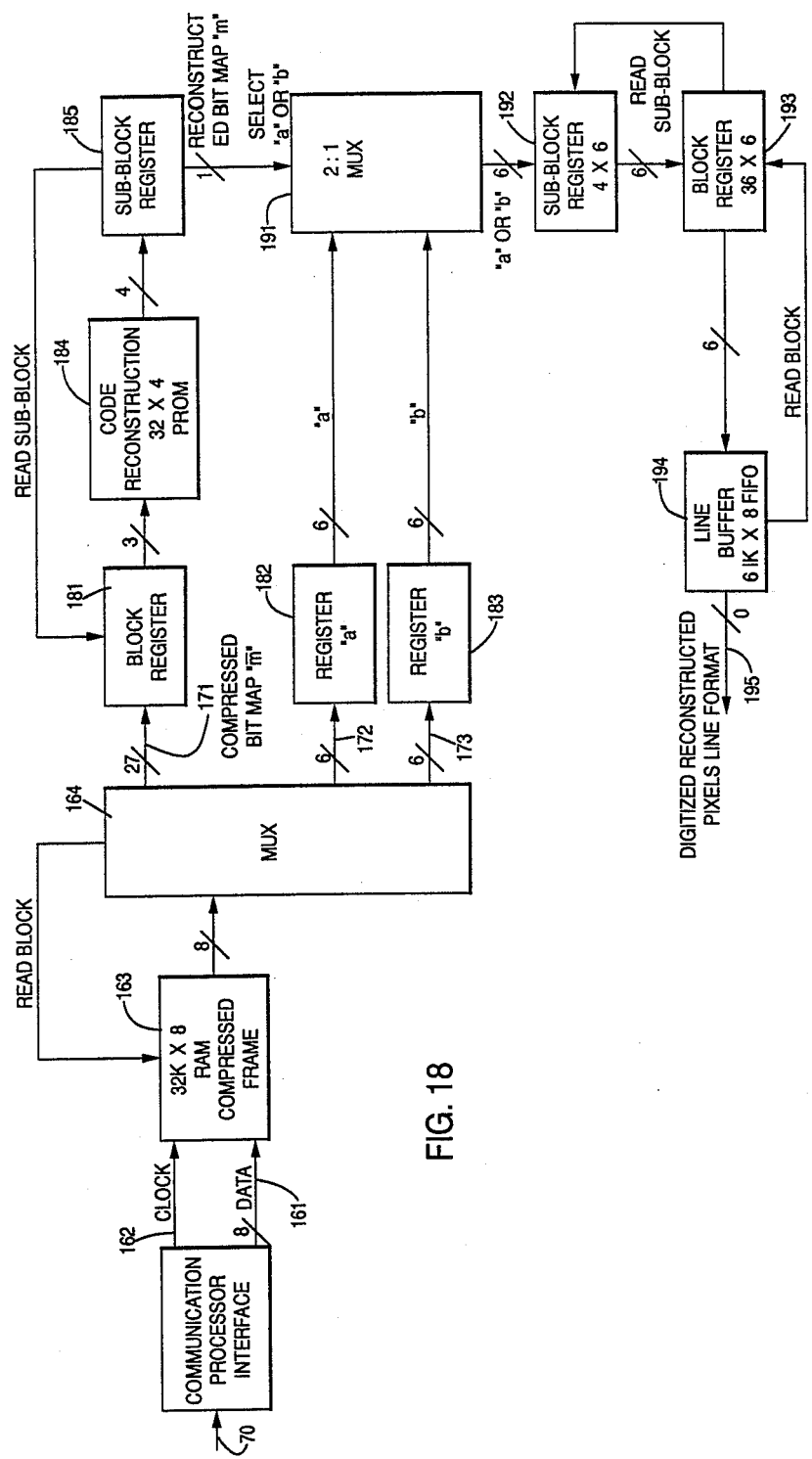
FIG. 18 shows the configuration of a digitized imagery data reconstruction processor located at a receiver site.

Reconstruction Unit (FIG. 18)

The configuration of a digitized imagery data reconstruction processor located at a receiver site and monitoring data communication channel 70 is diagrammatically illustrated in FIG. 18. Through a digital data communications interface 160, the compressed data and an associated recovered clock are coupled over respective links 161 and 162 to a compressed data frame buffer 163 which is capable of storing one frame of compressed imagery data. In terms of the parameters chosen for the present example, buffer 163 may comprise a 32KX8 RAM. The contents of the respective storage locations of buffer 163 are read out (deformatted) into their respective threshold components and compressed bit map components and controllably coupled via a multiplexer 164 over links 171, 172 and 173 to a block register 181 and "a" and "b" registers 182 and 183, respectively. The nine sub-blocks of a respective block-representative segment are coupled as address inputs to a code reconstruction PROM 184 to derive nine sets of four bit vectors corresponding to the attributes of Table 1 stored in sub-block register 185. The respective 1 and 0 values of each sub-block stored in register 185 are applied via a multiplexer 191 to respective data inputs of which the "a" and "b" values that have been deformatted from the compressed data codes stored in buffer 163 are coupled. As a consequence, one of the "a" and "b" threshold values will be coupled to a sub-block register 192 for each of the four pixel positions of the bit map sub-block. As each of the sub-blocks that make up a block is processed in this manner, it is loaded into register 193 until an entire block of 36 "a" and "b" threshold data values has been derived. Each block of data is then transferred into a line buffer 194 for readout over output link 195.

As will be appreciated from the foregoing description, the complexity and performance shortcomings of conventional imagery encoding mechanisms are obviated by an imagery data compression mechanism that does not require the use of a predetermined training sequence and which is adaptive from image to image and within the image itself, so that edge orientations and grey levels are preserved. Advantageously, because the compression mechanism of the present invention transmits output codes that are associated only with prescribed attributes of an image, the invention has an inherent enhancement property in that it tends to eliminate isolated data, while preserving contiguous data.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one or ordinary skill in the art.

What is claimed:

1. A method of compressing data containing a plurality of information symbols comprising the steps of:
    (a) for a respective portion of said data, information symbols within which are associated with a predefined attribute of the information represented by said data, generating a first code associated therewith; and
    (b) for a respective portion of said data, information symbols within which are associated with no predetermined attribute of the information represented by said data, generating a second code, associated with a predefined attribute of the information represented by said data, the error between the corresponding information signals represented thereby and said respective portion of said data the information symbols within which are associated with no predetermined attribute of information represented by said data is a minimum.

2. A method of compressing data containing a plurality of information symbols comprising the steps of:
   (a) grouping said plurality of information symbols into respective sets of information symbols;
   (b) for each set of information symbols that is associated with a prescribed attribute of said information, generating a first code representative thereof;
   (c) for a set of information symbols that is associated with no prescribed attribute of said information, modifying respectively different symbols in the set to derive a plurality of modified sets of information symbols, each of which modified sets is associated with a respectively different prescribed attribute of said information; and
   (d) generating a second code associated with that one of the modified sets of information symbols derived in step (c), the error between which one modified set and said set of information symbols that is associated with no prescribed attribute of said information is a minimum.

3. A method according to claim 2, wherein said data comprises an array of information symbols, step (a) comprises the step of subdividing said array of information symbols into a plurality of sets of k information symbols per set, and step (b) comprises generating, for each set of k information symbols that is associated with a prescribed attribute of said information, a first output code representative of said prescribed attribute.

4. A method according to claim 3, wherein step (c) comprises, for each set of k information symbols that is associated with no prescribed attribute of said information, modifying respectively different symbols of that set to derive a plurality of modified sets of k information symbols per set, each of which modified sets is associated with a respectively different prescribed attribute of said information, and step (d) comprises generating a second code associated with that one of the modified sets of k information symbols derived in step (c). the error between which one modified set and said set of k information symbols that is associated with no prescribed attribute of said information is a minimum.

5. A method according to claim 4, wherein said array of information symbols comprises an array of imagery representative data values.

6. A method according to claim 5, wherein said imagery representative data values are defined in accordance with block truncated coding of imagery data.

7. A method according to claim 6, wherein said imagery representative data values correspond to binary data bit map values derived by block truncated coding of imagery data.

8. A method of compressing and transmitting an array imagery representative data comprising the steps of:
   (a) encoding said array of imagery representative data in accordance with a prescribed encoding mechanism that produces a map of binary data values each of which is associated with a respective data symbol of said imagery representative data, and threshold codes associated with a set of threshold values through which the binary data values of said map are defined;
   (b) subdividing said map of binary data values into a plurality of sets of k binary data values per set;
   (c) for each set of k binary data values that is associated with a prescribed attribute of image represented by said imagery representative data, generating a first code representative thereof;
   (d) for each set of k binary data values that is associated with no prescribed attribute of image represented by said imagery representative data, inverting respectively different binary data values thereof to derive a plurality of modified sets of k binary data values per set, each of which modified sets is associated with a respectively different prescribed attribute of said image;
   (e) generating a second code associated with that one of the modified sets of k binary data values derived in step (d), the error between which one modified set and said set of k binary data values that is associated with no prescribed attribute of said information is a minimum;
   (f) combining the first and second codes generated in steps (c) and (e) and the threshold codes encoded in step (a) to produce an output code; and
   (g) transmitting the output code produced in step (f).

9. A method according to claim 8, wherein step (a) comprises the steps of:
   (a1) dividing said array of imagery representative data into a plurality of blocks of data values, and
   (a2) encoding each of said blocks of data values in accordance with a prescribed encoding mechanism that produces a map of binary data values each of which is associated with a respective data value of said imagery representative data, and threshold codes associated with a set of threshold values through which the binary data values of said map are defined; and wherein
   step (b) comprises subdividing said map of binary data values into a plurality of sub-blocks of k binary data values per sub-block.

10. A method according to claim 9, wherein said encoding mechanism comprises a block truncated coding mechanism.

11. A method according to claim 8, further including the steps of:
   (h) receiving the output code transmitted in step (g);
   (i) decoding said output code into a plurality of blocks of binary data values; and
   (k) reconstructing said array of imagery representative data in accordance with the blocks of binary data values decoded in step (i) and said threshold codes.

12. A method of compressing an array of imagery representative data comprising the steps of:
   (a) subdividing said array of imagery representative data into a plurality of blocks of data;
   (b) for each of said blocks of data, encoding the imagery representative data therein to produce a map of binary data values, each of which binary data values is associated with a respective data symbol of said imagery representative data, and threshold values through which the binary data values of said map are defined;
   (c) subdividing a respective map of binary data values into a plurality of sub-blocks of k binary data values per sub-block;

(d) for each sub-block of k binary data values that is associated with a prescribed attribute of the image represented by said imagery representative data, generating a first code representative thereof;

(e) for each sub-block of k binary data values that is associated with no prescribed attribute of said image, inverting respectively different binary data values thereof, to derive a plurality of modified sub-blocks of k binary data values, each of which modified sub-blocks is associated with a respectively different attribute of said image; and (f) for each sub-block of k binary values that is associated with no prescribed attribute of said image, generating a second code associated with that one of the modified sub-blocks of k binary data values derived in step (e), whose associated imagery representative data symbol produces the smallest deviation with respect to the threshold values through which the binary data values of said modified sub-blocks of k binary data values are defined.

13. A method according to claim 12, wherein step (b) comprises, for each block of data, encoding the imagery representative data therein in accordance with an encoding mechanism that produces a binary data bit map, each bit being associated with a respective data symbol of said imagery representative data, and a pair of threshold values through which the bits of said map are defined, and wherein step (f) comprises, for each sub-block of said bit map that is associated with no prescribed attribute of said image, generating an output code associated with that one of the modified sub-blocks derived in step (e), whose associated imagery representative data symbol produces the smallest deviation with respect to that one of the pair of threshold values through which the bits of said modified sub-blocks are defined.

14. An apparatus for compressing an array of imagery representative data comprising, in combination:

first means for subdividing said array of imagery representative data into a plurality of blocks of data;

second means, coupled to said first means, for encoding the imagery representative data each of said blocks of data to produce a map of binary data values, each of which binary data values is associated with a respective data symbol of said imagery representative data, and threshold values through which the binary data values of said map are defined;

third means, coupled to said second means, for subdividing a respective map of binary data values into a plurality of sub-blocks of k binary data values per sub-block and, for each sub-block of k binary data values that is associated with a prescribed attribute of the image represented by said imagery representative data, generating a first code representative thereof;

fourth means, coupled to said third means, for inverting, for each sub-block of k binary data values that is associated with no prescribed attribute of said image, respectively different binary data values thereof, to derive a plurality of modified sub-blocks of k binary data values, each of which modified sub-blocks is associated with a respectively different attribute of said image; and fifth means, coupled to said fourth means, for generating, for each sub-block of k binary values that is associated with no prescribed attribute of said image, a second code associated with that one of the modified sub-blocks of k binary data values derived by said fourth means, whose associated imagery representative data symbol produces the smallest deviation with respect to the threshold values through which the binary data values of said modified sub-blocks of k binary data values are defined.

15. An apparatus according to claim 14, wherein said second means comprises means for encoding, for each block of data, the imagery representative data therein in accordance with an encoding mechanism that produces a binary data bit map, each bit being associated with a respective data symbol of said imagery representative data, and a pair of threshold values through which the bits of said map are defined, and wherein said fifth means comprises means for generating, for each sub-block of said bit map that is associated with no prescribed attribute of said image, an output code associated with that one of the modified sub-blocks whose associated imagery representative data symbol produces the smallest deviation with respect to that one of the pair of threshold values through which the bits of said modified sub-blocks are defined.

16. An apparatus according to claim 15, further including sixth means for assembling each of the output codes generated by said third and fifth means and codes representative of said pair of threshold values into a data message for transmission over a data communications channel to a receiver site.

17. An apparatus according to claim 16, further comprising seventh means, disposed at said receiver site, for disassembling said data message and reconstructing therefrom symbols of said array of imagery representative data.

* * * * *